(No Model.)

P. B. DELANY.
ELECTRIC CURRENT INDICATOR.

No. 390,115. Patented Sept. 25, 1888.

Witnesses
Geo. W. Breck
Edward C. Davidson.

Inventor
Patrick B. Delany
By his Attorneys
Baldwin, Davidson & Wight

UNITED STATES PATENT OFFICE.

PATRICK BERNARD DELANY, OF NEW YORK, N. Y.

ELECTRIC-CURRENT INDICATOR.

SPECIFICATION forming part of Letters Patent No. 390,115, dated September 25, 1888.

Application filed May 26, 1888. Serial No. 275,154. (No model.)

*To all whom it may concern:*

Be it known that I, PATRICK BERNARD DELANY, a citizen of the United States, residing in New York city, State of New York, have invented a new and useful Electric-Current Indicator for the Use of Linemen and others, of which the following is a specification.

The care of electric-light wires is, under the present manner of suspending and running them, and, indeed, under any other system which can be devised, fraught with danger.

The object of my invention is to provide a simple, cheap current-indicator to be worn upon the hand, so that an operator by merely bringing it into suitable proximity to a wire can tell at once whether it is a "live" or "dead" one, and can also to some extent ascertain the character of the current.

The device may be in the form of a finger-ring having a magnetic needle inclosed within a suitable case and covered by a glass. It may be worn upon the hand with the same comfort and unconsciousness that ordinary finger-rings are, and can be tastefully and ornamentally decorated.

Figure 1:
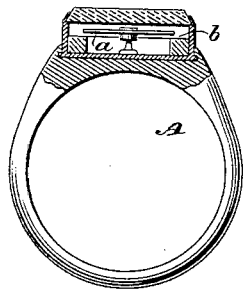
Figure 2:
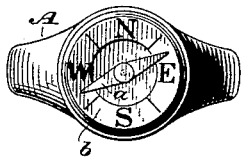

In the accompanying drawings, Figure 1 is an elevation, partly in section; Fig. 2, a plan view, and Fig. 3 a sectional view showing iron filings or turnings instead of a magnetic needle.

Upon the ring A a magnetic needle, $a$, is mounted within an inclosed protecting-chamber having a glass cover, as shown. An annular scale, $b$, may be provided also, if desired, so as to constitute an ordinary compass.

Figure 3:
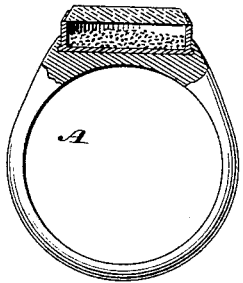

Instead of using a magnetic needle, I may place within the chamber a small quantity of iron filings or turnings, as shown in Fig. 3. They will by their behavior indicate the presence of an electric current of any considerable strength. I prefer, however, to use the ordinary compass-needle.

An instrument of this character may be worn constantly, and is always ready at hand for the testing of wires.

It would be useful especially to those who have occasion to handle electric-light wires, and would also be of general use to persons tending dynamos, or who are otherwise employed in connection with electrical apparatus.

I claim as my invention—

1. An electric-current indicator for the use of persons exposed to danger from high-tension currents, consisting of a ring or band adapted to be worn upon the hand and having an electric-current indicator thereon, substantially as and for the purpose set forth.

2. An electric-current indicator for the use of persons exposed to danger from high-tension currents, consisting of a finger-ring having a magnetic-current-indicating needle mounted thereon, substantially as and for the purpose set forth.

3. An electric-current indicator for the use of persons exposed to danger from high-tension currents, consisting of a finger-ring having mounted thereon a magnetic needle, and a scale showing the points of the compass, substantially as shown.

In testimony whereof I have hereunto subscribed my name.

PATRICK BERNARD DELANY.

Witnesses:
EDWARD C. DAVIDSON,
LLOYD B. WIGHT.